(12) United States Patent
Barnett et al.

(10) Patent No.: US 6,771,939 B1
(45) Date of Patent: Aug. 3, 2004

(54) CONTACTS COVERED WITH ELECTRO-RESISTIVE MATERIAL ON A RADIO TELEPHONE

(75) Inventors: Ricky Barnett, Tokyo (JP); Andrew Aguilar, Hemel Hempstead (GB); Philip Barrowclough, Basingstoke (GB)

(73) Assignee: Nokia Mobile Phones Limited, Espoo (FI)

( * ) Notice: Subject to any disclaimer, the term of this patent is extended or adjusted under 35 U.S.C. 154(b) by 356 days.

(21) Appl. No.: 09/604,734

(22) Filed: Jun. 28, 2000

(30) Foreign Application Priority Data

Jun. 30, 1999 (GB) .............................................. 9915329

(51) Int. Cl.⁷ ................................................. H04Q 7/20
(52) U.S. Cl. .................... 455/90.3; 455/550.1; 455/128
(58) Field of Search ......................... 455/550, 90, 128, 455/347, 351, 575, 566, 556, 557; 439/67, 66, 79, 86, 87; 361/727, 731, 732; 338/114; 206/811

(56) References Cited

U.S. PATENT DOCUMENTS

| | | | | |
|---|---|---|---|---|
| 3,509,296 A | * | 4/1970 | Harshman et al. | 137/828 |
| 3,871,737 A | * | 3/1975 | Dorrell et al. | 439/88 |
| 3,959,610 A | * | 5/1976 | Finnegan et al. | 200/5 A |
| 3,971,610 A | * | 7/1976 | Buchoff et al. | 439/75 |
| 4,273,682 A | * | 6/1981 | Kanamori | 252/511 |
| 5,163,836 A | | 11/1992 | Young et al. | 439/67 |
| 5,223,780 A | * | 6/1993 | Hu | 320/112 |
| 5,699,406 A | * | 12/1997 | Liikanen et al. | 455/558 |
| 5,788,516 A | | 8/1998 | Uggmark | 439/86 |
| 5,810,617 A | * | 9/1998 | Hasagawa | 439/510 |
| 5,927,997 A | * | 7/1999 | Ruland et al. | 439/31 |
| 5,956,625 A | * | 9/1999 | Hansen et al. | 455/90 |

FOREIGN PATENT DOCUMENTS

| | | |
|---|---|---|
| EP | 0880299 | 11/1998 |
| GB | 1255761 | 1/1970 |

OTHER PUBLICATIONS

Leonard S. Buchoff, Advanced Non–Soldering Interconnection, 8079 Electro Conference Record, 16 (1991) Apr. 16–18, 1991, New York, NY US, pp. 248–251.

\* cited by examiner

*Primary Examiner*—Jean Gelin
(74) *Attorney, Agent, or Firm*—Antonelli, Terry, Stout & Kraus, LLP

(57) ABSTRACT

A portable radiotelephone device is provided that includes a body having provided on one or more exposed surface thereof one or more electrical contacts for one or more respective electrical input/output devices. The electrical contacts are covered with one or more layers of electro-resistive material. The electro-resistive material in the relaxed condition being an electrical insulator and in the stressed state being an electrical conductor. The arrangement is such that to effect electrical connection between any of the one or more electrical contacts with respective one or more electrical input/output devices, respective contacts and input/output devices are mutually engaged so as to load the elasto-resistive material under compression.

12 Claims, 3 Drawing Sheets

CONTACTS COVERED WITH ELECTRO-RESISTIVE MATERIAL ON A RADIO TELEPHONE

BACKGROUND OF THE INVENTION

The present invention relates to a portable radio communication device.

Portable radio communication devices, in particular mobile phones, are becoming increasingly commonplace nowadays. Accordingly, the design of a mobile phone must take into consideration factors such as the different environments in which the mobile phone is likely to be used. In particular, given that mobile phones are typically used on-the-move and out-of-doors, it is important that they be resistant to the ingress water. Preferably, mobile phones should be rain proof, or at least shower proof.

Mobile phones are also increasingly being carried around and used during sports activities so that the user is ever contactable. For example, it is not uncommon for a user to take a mobile phone along with him/her whilst jogging. This places a new set of demands in the design of a mobile phone. Whilst of course, the mobile phone must be small and lightweight, it must also be solid, robust and capable of withstanding rain and sweat.

In currently available mobile phones, the risk of water ingress is conventionally tackled by providing fluid tight seals, gaskets and plugs in areas where the phone is susceptible to water getting in, e.g. at external connections such as the system connector. Current mobile phone designs however do not provide entirely satisfactory protection against water ingress. Furthermore, current phones not able to deal with the demands placed on them by sports usage.

SUMMARY OF THE INVENTION

Accordingly, the present invention provides a portable radiotelephone device comprising a body having provided on one or more exposed surface thereof one or more electrical contact means for one or more respective electrical input/output means, wherein said one or more electrical contact means is covered with one or more layers of electro-resistive material, said electro-resistive material in the relaxed condition being an electrical insulator and in the stressed state being an electrical conductor, the arrangement being such that to effect electrical connection between any of the one or more electrical contact means with respective one or more electrical input/output means, respective contact means and input/output means are mutually engaged so as to load the elasto-resistive material under compression.

By means of the invention, the exposed electrical contact points of the mobile phone on external surfaces thereof are sealed against the ingress of water, in a compression contacting system. More specifically, the elasto-resistive (ER) material with its polymer composition provides a seal at the phone's external electrical contact points. This represents a considerable improvement over the prior art radiotelephones in which the electrical contacts are traditionally constructed from copper are vulnerable to water ingress and to corrosion. Furthermore, the ER material affords increased wear and in general provides for an altogether more robust phone The basic operating principle of the ER material is that its resistance reduces as a mechanical force is applied, changing from being an insulator to a conductor when mechanically loaded. The applied loading may be compression, tension, torsion or shear forces. The chemical composition and structure of an ER material basically comprises an elastically deformable polymer that includes an electrically conductive filler spread out within and encapsulated by, the non-conductive elastomer structure, and a modifier which promotes the elasticity of the material. Accordingly, the ER material exhibits a change in its bulk conductivity from that of the elastomer to that of the entrapped conductive filler particles. Further details of a suitable ER material are given in patent publication PCT/GB98/00206. The properties of the elasto-resistive material described in this PCT publication are as follows: in an unstressed state the elasto-resistive material is an insulator with resistance of between $10^{12}$ to $10^{14}$ ohms per centimeters. Upon loading the resistance decreases to between 1 to 100 micro ohms per centimeter. It has been found that resistance is inversely proportional to the load applied. Furthermore, by varying the chemical composition of the material, the force needed to change state can be adjusted from being a heavy point load at the high end, down to audio sensitivity at the lower end, e.g. speech activation.

The elasto-resistive material may be a polymer composition comprising electrically conducting particles encapsulated within an electrically insulating elastomer, the ratio of the conducting particles to the non-conducting elastomer being such that the electrical resistivity of the material varies in a linear manner in response to the application of force to the material.

The conductive filler may be a metal powder such as Ni INCO 287. The elastomer may be a silicone elastomer based on polydimethylsiloxane and having a low surface energy, and being high on the triboelectric series. The modifier may be fumed silica.

Conveniently, the ratio of conductive filler to elastomer is in the range 1:1 to 3:1.

Advantageously, the use of the ER material provides for localised conduction between respective electrical connections.

BRIEF DESCRIPTION OF THE DRAWINGS

The present invention will now be described by way of example with reference to the accompanying drawings in which.

DETAILED DESCRIPTION OF THE INVENTION

Figure 1:
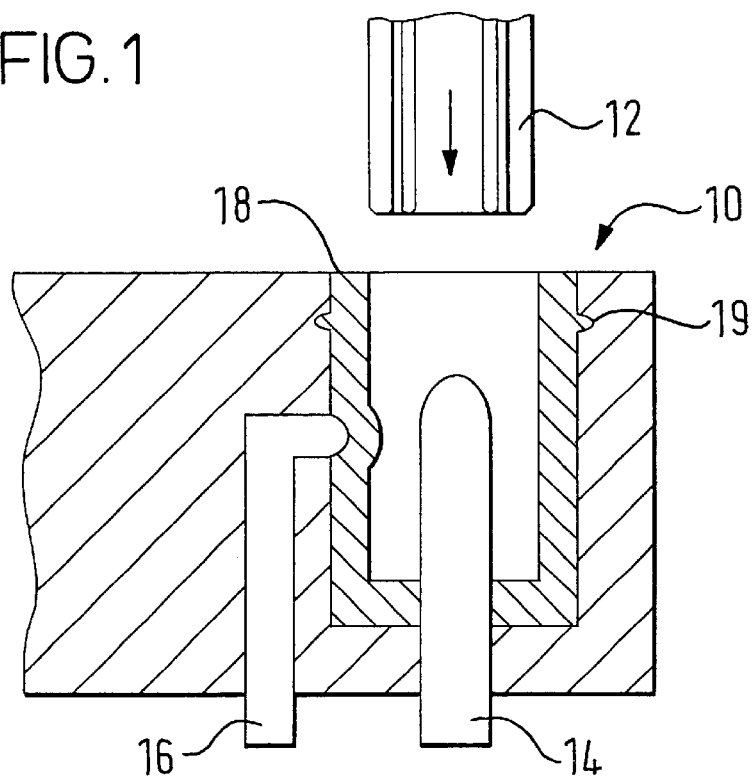
FIG. 1 is a schematic sectional side view of a first embodiment of the present invention.

FIG. 1 illustrates a jack socket 10 and a jack plug 12 about to be inserted into the jack socket (as indicated by the downward arrow on the jack plug). Jacks are commonly used to effect electrical connections between two electrical devices. The jack socket in this embodiment forms part of a system connector for a mobile phone. The jack socket includes a pair of fixed contacts 14, 16, one which extends centrally from the base of the socket 14 and the other which forms the outer contact 16 in the jack socket. In this embodiment a layer of ER material 18 lines the internal wall surface that defines the jack socket. To achieve this lining, the ER material is provided in the form of a continuous cylinder which is open at one end (the upper end) and with a small hole in the centre of the other end (the lower end). The ER material cylinder is inserted into the jack socket 10 with the end with the hole in the centre being introduced first so that the hole fits over the central contact point 14 of the jack socket which thus forms an interference fit therewith. In a variation of this embodiment, the ER material is provided without a hole at its lower end and instead has a sheath for covering the central electrical contact. The outer contact 16 in the jack socket may be of solid design and not sprung as would normally be the case. The jack socket without the plug inserted into it has the ER material in a relaxed state and it therefore acts as an electrical insulator.

On the introduction of the jack plug 12 into the jack socket 10 the ER lining 18 is compressed, that is to say the dimensions of the socket, the ER lining and the diameter of the jack plug are such that the ER material is compressed outwardly. In response to compression, the ER material changes state from an insulator to an electrical conductor and thus allows the flow of electrical current between the plug 12 and the fixed contact points 14, 16 thereby completing the circuit. The ER material lining 18 can be provided with an outwardly extending shoulder 19 which inter-engages with a groove provided in the upper area of the jack socket, thereby providing a sealing feature therebetween. Accordingly, such a system connector would be resistant to water ingress.

Figure 2A:
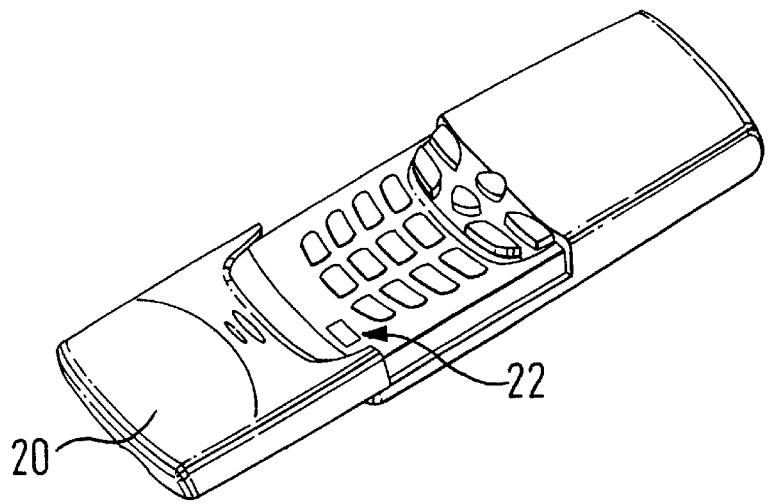
FIGS. 2a and 2b are schematic perspective views of a second embodiment of the present invention.
Figure 2B:
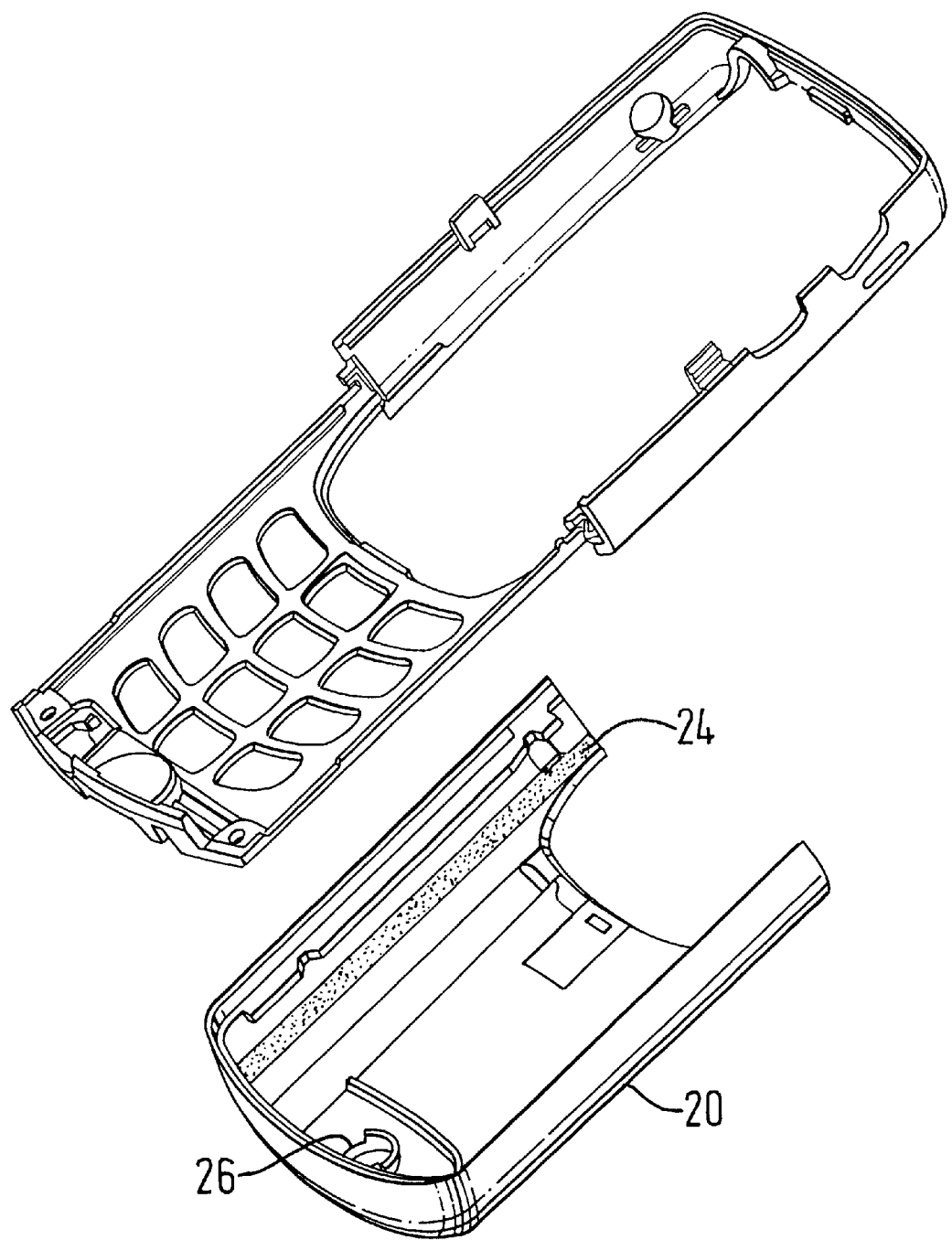

In a second embodiment of the present invention illustrated in FIGS. 2*a* and 2*b*, there is shown a mobile phone with a slide cover member 20 which is adapted to slide between a closed position in which at least some of the key pad elements are covered and an open position in which the keypad elements are exposed. In the open position with the slide cover lowered in relation to the phone body, electrical connections must be sustained between the electrical elements in the sliding member, for example the microphone, and these must be conducted to the main body of the telephone which houses the processing printed circuit boards. To effect electrical connection between the slide cover member and the main body of the telephone, a patch of elasto-resistive material is positioned on the main body of the phone at its lower end 22 (FIG. 2*a* top perspective, wherein the slide cover member is shown 'overslid' beyond its normal open operating position in order to illustrate the elasto-resistive patch 22.) and this is in electrical connection with a strip of the elasto-resistive material 24 provided on the undersurface of the slide cover 20 (FIG. 2*b* underside perspective). The elasto-resistive patch 22 connects on the inside with the internal electronic circuitry of the mobile phone, whilst the elasto-resistive strip 24 connects to the microphone 26 at the lower end of the slide cover member 20. The tolerance fits between the mobile phone body and the slide cover 20 are designed so that as the slide cover 20 is slid onto the main body of the phone there is a small amount of interference between the elasto-resistive strip 24 and the elasto-resistive patch 22. Accordingly, there is compression between the elasto-resistive strip 24 and the patch 22, and thus an electrical connection is maintained by virtue of the elasto-resistive material. Furthermore, the electrical connection is free from water ingress.

Figure 3:
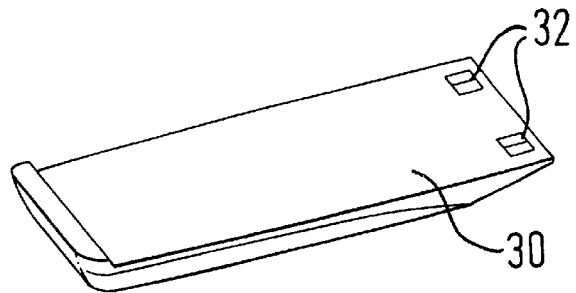
FIG. 3 is a schematic perspective view of a third embodiment of the present invention.

In a third embodiment of the present invention as illustrated in FIG. 3, a battery 30 of a mobile phone is modified by using ER material for the electrical contacts 32. In this embodiment, the ER material is used as the battery contact hence the interface can be made fully waterproof. When the battery pack is disconnected from the phone the contacts are uncompressed, i.e. relaxed and are therefore insulating. Once the battery is attached to the phone the contacts are compressed and become conductive. This arrangement is advantageous to prevent short-circuiting of the battery contacts of loose battery packs since the elasto-resistive polymer conducts only under mechanical loading.

The battery contacts can be assembled as a loose part into the battery covers, relying on compression to seal the apertures and make electrical contact. Alternatively, an insert or two shot injection moulding process could be used and the contacts would be an integral part of the battery cover mouldings.

Figure 4A:
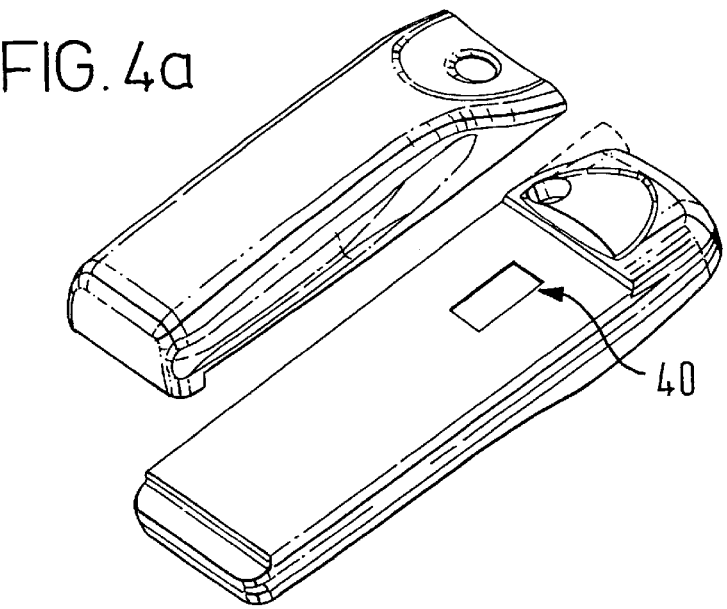
FIG. 4a is a schematic perspective view of a fourth embodiment of the present invention.
Figure 4B:
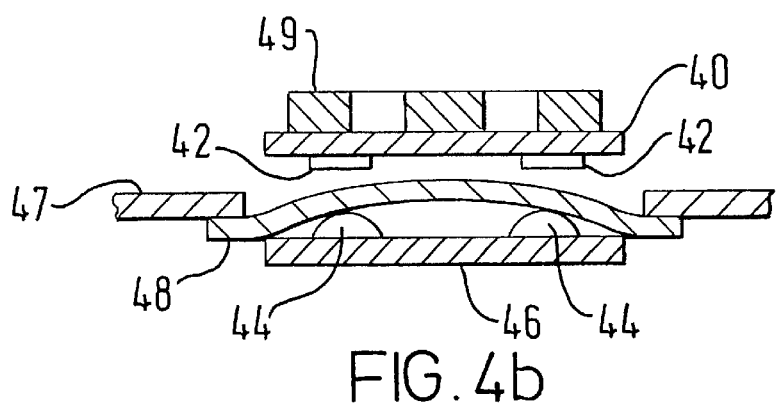
FIG. 4b is a part sectional side view of the same embodiment.

In a fourth embodiment of the present invention as illustrated in FIGS. 4*a* and 4*b*, a SIM card connector is provided with elasto-resistive material protecting the contact pads. The part sectional view of FIG. 4*b* shows the arrangement of the components in this embodiment, a SIM card 40 carries the SIM connections 42, the card 40 is loaded in registration with contact points 44 provided on a PCB 46. The PCB 46 is accessed through an aperture in the back cover housing 47 of the mobile phone, and a layer of elasto-resistive material 48 covers the contact points 44. The elasto-resistive material could be insert moulded into the back cover of the mobile phone. The arrangement is such that in use the elasto-resistive material 48 is compressed between the SIM connections 42 and the PCB contact points 44 when a latch member 49 is pressed onto the back of the SIM card and locked into place in relation to the back cover housing 47 thereby forming a waterproof conductive seal. This mitigates a problem with known SIM connectors which tend to allow a leak path to the internals of the phone.

A fifth embodiment of the present invention provides a way of making PCB board connections in the Z axis and replaces for example 'zebra strip' connectors, spring connectors and plug/socket connectors. Zebra strip connectors in particular are known to be problematic, often distorting and causing fading in LCD displays.

Figure 5:
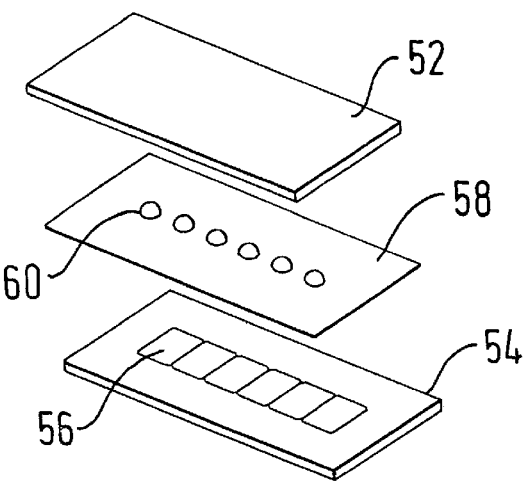
FIG. 5 is a schematic perspective view of a fifth embodiment of the present invention.

Referring to FIG. 5, there is shown two PCBs 52, 54 which are substantially parallel, one facing the other. Each. PCB carries a series of corresponding electrical connections 56 which are to be electrically bridged. Disposed between the two PCBs is a piece of elasto-resistive material 58 which has extending outwards from the surfaces of both of its sides are a series of ER contact bumps 60. The ER contact bumps are arranged in such a manner on the ER layer so that each ER bump is in alignment with the corresponding opposing pairs of electrical contacts on the two PCBs to be electrically connected together. Once the ER contact bumps and PCB contacts are in alignment, the two PCBs are brought together thereby compressing the ER contact bumps between corresponding opposing pairs of electrical contacts. The compression of the ER contact bumps creates a localised conductive path or paths between opposing pairs of contact pads on the PCBs. This provides for a low profile less than 0.5 mm board to board connection reliably and cost effectively. Manufacturing is also simpler and can use for instance injection moulding. In the assembly of the mobile phone, the components can be loose fitted and at final assembly compressed together. Positive location would be achieved by means of locating dowels and holes or other moulded in features.

The present invention may be embodied in other specific forms without departing from its essential attributes. For example, whilst the invention has been illustrated with different embodiments thereof, one or more of these embodiments could be combined in a single mobile phone. Accordingly reference should be made to the appended claims and other general statements herein rather than to the foregoing specific description as indicating the scope of invention.

Furthermore, each feature disclosed in this specification (which term includes the claims) and/or shown in the drawings may be incorporated in the invention independently of other disclosed and/or illustrated features. In this regard, the invention includes any novel features or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A portable radiotelephone device comprising a body having provided on one or more exposed surface thereof one or more electrical contact means for one or more respective electrical input/output means, wherein said one or more electrical contact means is covered with one or more layers of elasto-resistive material, said elasto-resistive material in the relaxed condition being an electrical insulator and in the stressed state being an electrical conductor, the arrangement being such that to effect electrical connection between any of the one or more electrical contact means with respective one or more electrical input/output means, respective contact means and input/output means are mutually engaged so as to load the elasto-resistive material under compression.

2. A portable radiotelephone device according to claim 1, wherein the electrical contact means and the electrical input/output means comprises a jack socket and plug respectively, and the elasto-resistive material covers the jack socket.

3. A portable radiotelephone device according to claim 1, wherein the electrical contact means and the electrical input/output means comprises a sliding cover electrical connection arrangement comprising a contact area on the body electrically connected with a contact strip on the sliding cover.

4. A portable radiotelephone device according to claim 1, wherein the electrical contact means and the electrical input/output means comprises battery contact points of the device and battery contacts respectively, and the elasto-resistive material covers the battery contact points of the device.

5. A portable radiotelephone device according to claim 1, wherein the electrical contact means and the electrical input/output means comprises SIM contact points of the device and SIM pads of a SIM card respectively, and the elasto-resistive material covers the SIM contact points.

6. A portable radiotelephone device according to claim 1, wherein the body of the portable radiotelephone device includes battery contact points provided as the one or more respective electrical input/output means, wherein electrical connection is made when battery contacts of a battery unit are engaged with said battery contact points so as to load the elasto-resistive material under compression.

7. A portable radiotelephone device comprising:

a body having provided on one or more exposed surface thereof one or more electrical contacts for one or more respective electrical input/output devices, wherein said one or more electrical contacts is covered with one or more layers of elasto-resistive means for preventing water ingress into said body, said elasto-resistive means in a relaxed condition being an electrical insulator and in a stressed state being an electrical conductor, the arrangement being such that to effect electrical connection between any of the one or more electrical contacts with respective one or more electrical input/output devices, respective contacts and input/output devices are mutually engaged so as to load the elasto-resistive means under compression.

8. A portable radiotelephone device according to claim 7, wherein the electrical contacts and the electrical input/output device comprise a jack socket and plug respectively, and the elasto-resistive means includes material that covers the jack socket.

9. A portable radiotelephone device according to claim 7, wherein the electrical contacts and the electrical input/output device comprise a sliding cover electrical connection arrangement comprising a contact area on the body electrically connected with a contact strip on the sliding cover.

10. A portable radiotelephone device according to claim 7, wherein the electrical contacts and the electrical input/output device comprise battery contact points of the device and battery contacts respectively, and elasto-resistive means includes material that covers the battery contact points of the device.

11. A portable radiotelephone device according to claim 7, wherein the electrical contacts and the electrical input/output device comprise SIM contact points of the device and SIM pads of a SIM card respectively, and the elasto-resistive means includes material that covers the SIM contact points.

12. A portable radiotelephone device according to claim 7, wherein the body of the portable radiotelephone device includes battery contact points provided as the one or more respective electrical input/output devices, wherein electrical connection is made when battery contacts of a battery unit are engaged with said battery contact points so as to load the elasto-resistive means under compression.

* * * * *